(12) United States Patent
Jia et al.

(10) Patent No.: US 9,099,704 B2
(45) Date of Patent: Aug. 4, 2015

(54) METHODS OF OPERATING FUEL CELL STACKS AND SYSTEMS

(75) Inventors: Nengyou Jia, Surrey (CA); Shanna D. Knights, North Vancouver (CA)

(73) Assignee: BDF IP Holdings LTD., Vancouver, BC (CA)

(*) Notice: Subject to any disclaimer, the term of this patent is extended or adjusted under 35 U.S.C. 154(b) by 575 days.

(21) Appl. No.: 13/375,850

(22) PCT Filed: Jun. 3, 2010

(86) PCT No.: PCT/US2010/037317
§ 371 (c)(1),
(2), (4) Date: Feb. 28, 2012

(87) PCT Pub. No.: WO2010/141769
PCT Pub. Date: Dec. 9, 2010

(65) Prior Publication Data
US 2012/0148929 A1 Jun. 14, 2012

Related U.S. Application Data

(60) Provisional application No. 61/183,790, filed on Jun. 3, 2009.

(51) Int. Cl.
*H01M 8/04* (2006.01)
*H01M 4/92* (2006.01)
*H01M 8/10* (2006.01)

(52) U.S. Cl.
CPC .......... *H01M 8/0494* (2013.01); *H01M 8/0488* (2013.01); *H01M 8/04089* (2013.01); *H01M 8/04223* (2013.01); *H01M 8/04231* (2013.01); *H01M 8/04238* (2013.01); *H01M 8/04559* (2013.01); *H01M 8/04753* (2013.01); *H01M4/92* (2013.01); *H01M 2008/1095* (2013.01); *Y02E 60/50* (2013.01)

(58) Field of Classification Search
CPC ..................... H01M 8/04089; H01M 8/04223; H01M 8/04231
USPC .......................................................... 429/429
See application file for complete search history.

(56) References Cited

U.S. PATENT DOCUMENTS

| | | | |
|---|---|---|---|
| 6,472,090 B1 | 10/2002 | Colbow et al. | 429/13 |
| 7,442,453 B1 * | 10/2008 | Patterson et al. | 429/410 |
| 2008/0206610 A1 | 8/2008 | Saunders et al. | 429/13 |

OTHER PUBLICATIONS

Liu et al., "Behavior of PEMFC in starvation," *Journal of Power Sources* 157: 166-176, 2006.
Nagahara et al., "The impact of air contaminants on PEMFC performance and durability," *Journal of Power Sources* 182: 422-428, 2008.
Shi et al., "Hydrogen sulfide poisoning and recovery of PEMFC Pt-anodes," *Journal of Power Sources* 165: 814-818, 2007.

* cited by examiner

*Primary Examiner* — Jonathan Jelsma
(74) *Attorney, Agent, or Firm* — Seed IP Law Group PLLC

(57) ABSTRACT

A method for removing contaminants in a fuel cell comprises: supplying a hydrogen-based fuel to the anode; supplying a first oxidant to the cathode, wherein the first oxidant comprises at least some sulfur dioxide; drawing a primary load from the fuel cell stack while supplying the hydrogen-based fuel to the anode and the air to the cathode; shutting down the fuel cell when a voltage of the fuel cell is equal to or less than a threshold voltage at which sulfur crosses over from the cathode to the anode, wherein shutting down the fuel cell comprises: performing at least one oxidant starvation while drawing the primary load, removing the primary load after performing the at least one oxidant starvation, and bringing the anode to a high potential after removing the primary load; and thereafter, restarting the fuel cell.

18 Claims, 2 Drawing Sheets

METHODS OF OPERATING FUEL CELL STACKS AND SYSTEMS

CROSS-REFERENCE TO RELATED APPLICATIONS

This application claims the benefit under 35 U.S.C. 119(e) of U.S. Provisional Patent Application No. 61/183,790, filed Jun. 3, 2009, which provisional application is incorporated herein by reference in its entirety.

BACKGROUND

1. Technical Field

The present invention relates to electrochemical fuel cells, and in particular, to methods of operating fuel cell stacks and systems to mitigate sulfur contamination.

2. Description of the Related Art

Fuel cells convert fuel and oxidant to electricity and reaction product. Proton exchange membrane fuel cells employ a membrane electrode assembly ("MEA") having a proton exchange membrane ("PEM") (also known as an ion-exchange membrane) interposed between an anode electrode and a cathode electrode. The anode electrode typically includes electrocatalyst and binder, often a dispersion of polytetrafluoroethylene (PTFE) or other hydrophobic polymer, and may also include a filler (e.g., carbon). The anode electrode may also comprise electrocatalyst and an ionomer, or a mixture of electrocatalyst, ionomer and binder. The presence of ionomer in the electrocatalyst layer effectively increases the electrochemically active surface area of the electrocatalyst, which requires an ionically conductive pathway to the cathode electrocatalyst to generate electric current. The cathode electrode may similarly include electrocatalyst and binder and/or ionomer. Typically, the electrocatalyst used in the anode and the cathode is platinum or platinum alloy (e.g., platinum black, platinum-rutheninum and platinum-cobalt, and others commonly known in the art). The electrocatalyst may or may not be supported on an electrically-conductive support material, such as carbon black, graphitized carbon, or graphite. Each electrode may further include a microporous, electrically conductive substrate, such as carbon fiber paper or carbon cloth, which provides structural support to the membrane and serves as a fluid diffusion layer. The anode and cathode electrodes may be bonded or sealed to the PEM to form a single integral MEA unit.

The MEA is further interposed between two fluid flow plates to form a fuel cell assembly. The plates allow access of reactants to the MEA, act as current collectors, and provide support for the adjacent electrodes. A plurality of fuel cell assemblies may be combined to form a fuel cell stack.

During fuel cell operation, a primary load is drawn from the fuel cell. At the anode, fuel (typically in the form of hydrogen gas) reacts at the anode electrocatalyst in the presence of the PEM to form hydrogen ions and electrons. At the cathode, oxidant (typically oxygen in air) reacts with the hydrogen ions, which pass through the PEM, in the presence of the cathode electrocatalyst to form water. The PEM also serves to isolate the fuel stream from the oxidant stream while facilitating the migration of the hydrogen ions from the anode to the cathode. The electrons pass through an external circuit, creating a flow of electricity to sustain the primary load. In practice, fuel cells need to be robust to varying operating conditions and impurities in the reactants that poison or contaminate the fuel cell electrocatalyst.

Reformed fuels are typically employed in fuel cells and fuel cell systems that employ hydrocarbon-based fuels, such as natural gas and gasoline. Such fuels can be stored on-board fuel cell systems or provided via gas lines, and reformed in a reformer to produce hydrogen and carbon dioxide along with small amounts of impurities, such as carbon monoxide and hydrogen sulfide ($H_2S$). It is known in the art that hydrogen sulfide poisons platinum-based anode electrocatalysts by adsorbing onto the electrocatalyst as Pt—$(H_2S)_{ads}$, thereby decreasing the effective platinum surface area (EPSA) and, thus, fuel cell performance. As the contamination mechanism is cumulative, a continuous supply of the reformed fuel will lead to increasing amounts of hydrogen sulfide adsorbing on the electrocatalyst. It is generally known that hydrogen sulfide can be removed from the anode platinum-based electrocatalyst by cyclic voltammetry scanning between 0 and 1.4 V versus DHE (dynamic hydrogen electrode), or by applying a high voltage pulse (1.5 V for 2 min) followed by a low voltage pulse (0.2 V for 2 min) to each cell (see W. Shi et al., *Journal of Power Sources*, 165: 814-818, 2007). In other methods, an adsorption means may be employed upstream of the fuel cell stack to remove hydrogen sulfide from the reformed fuel prior to supplying the fuel to the fuel cell stack.

Impurities in the air used for the oxidant can also have a negative effect on fuel cell performance. One impurity typically found in air is sulfur dioxide ($SO_2$). Sulfur dioxide adsorbs onto the platinum electrocatalyst in the cathode as Pt—$(SO_2)_{ads}$ in a cumulative fashion, and continually decreases fuel cell performance as air (and sulfur dioxide) is continuously supplied. In polluted air, sulfur dioxide poisoning becomes an even more significant problem because sulfur dioxide can exist in large concentrations, sometimes exceeding 0.125 ppm (parts per million) in highly polluted air. It is generally known that fuel cell performance can be at least partially recovered from such poisoning by cyclic voltammetry scanning, for example, between 0 and 0.9 V versus DHE, followed by high humidity operation (see Y. Nagahara et al., *Journal of Power Sources*, 182: 422-428, 2008). Sulfur dioxide may also be decreased or prevented from entering the fuel cell by employing a filter means upstream of the fuel cell.

In summary, there are many methods to remove poisons and impurities that adsorb onto the platinum electrocatalyst. However, such methods are often difficult to employ in real-world applications. Potential cycling performed by cyclic voltammetry scanning is typically not used in commercial fuel cell systems as it requires additional equipment that is not commonly found in commercial fuel cell systems, and thus is not practical. In addition, filters and adsorption means are not preferable due to increased cost and/or increased system complexity, and trace amounts of sulfur may still be introduced into the fuel cell system. As a result, there remains a need for improved methods to mitigate sulfur poisoning in fuel cells. The present invention addresses these needs and provides further related advantages.

BRIEF SUMMARY

A method for removing contaminants in a fuel cell comprising an anode comprising a first platinum-based electrocatalyst, a cathode comprising a second platinum-based electrocatalyst, and a polymer electrolyte interposed therebetween, the method comprising: supplying a hydrogen-based fuel to the anode; supplying a first oxidant to the cathode, wherein the first oxidant comprises at least about 0.01 parts per million (ppm) sulfur dioxide; drawing a primary load from the fuel cell while supplying the hydrogen-based fuel to the anode and the first oxidant to the cathode; shutting down the fuel cell when a voltage of the fuel cell is equal to or less than a threshold voltage at which sulfur crosses over from the cathode to the anode, wherein shutting down the fuel cell comprises: performing at least one oxidant starvation while drawing the primary load, removing the primary load after performing the at least one oxidant starvation, and bringing the anode to a high potential after removing the primary load; and thereafter restarting the fuel cell.

In one embodiment, the voltage of the fuel cell is the difference between an anode potential and a cathode potential, and the threshold voltage at which sulfur crosses over from the cathode to the anode is equal to or less than about 0.55 V. In another embodiment, the voltage of the fuel cell is a cathode potential, and the threshold voltage at which sulfur crosses over from the cathode to the anode is about 0.55 V.

These and other aspects of the invention will be evident upon reference to the following detailed description and attached drawings.

DETAILED DESCRIPTION

Figure 1:
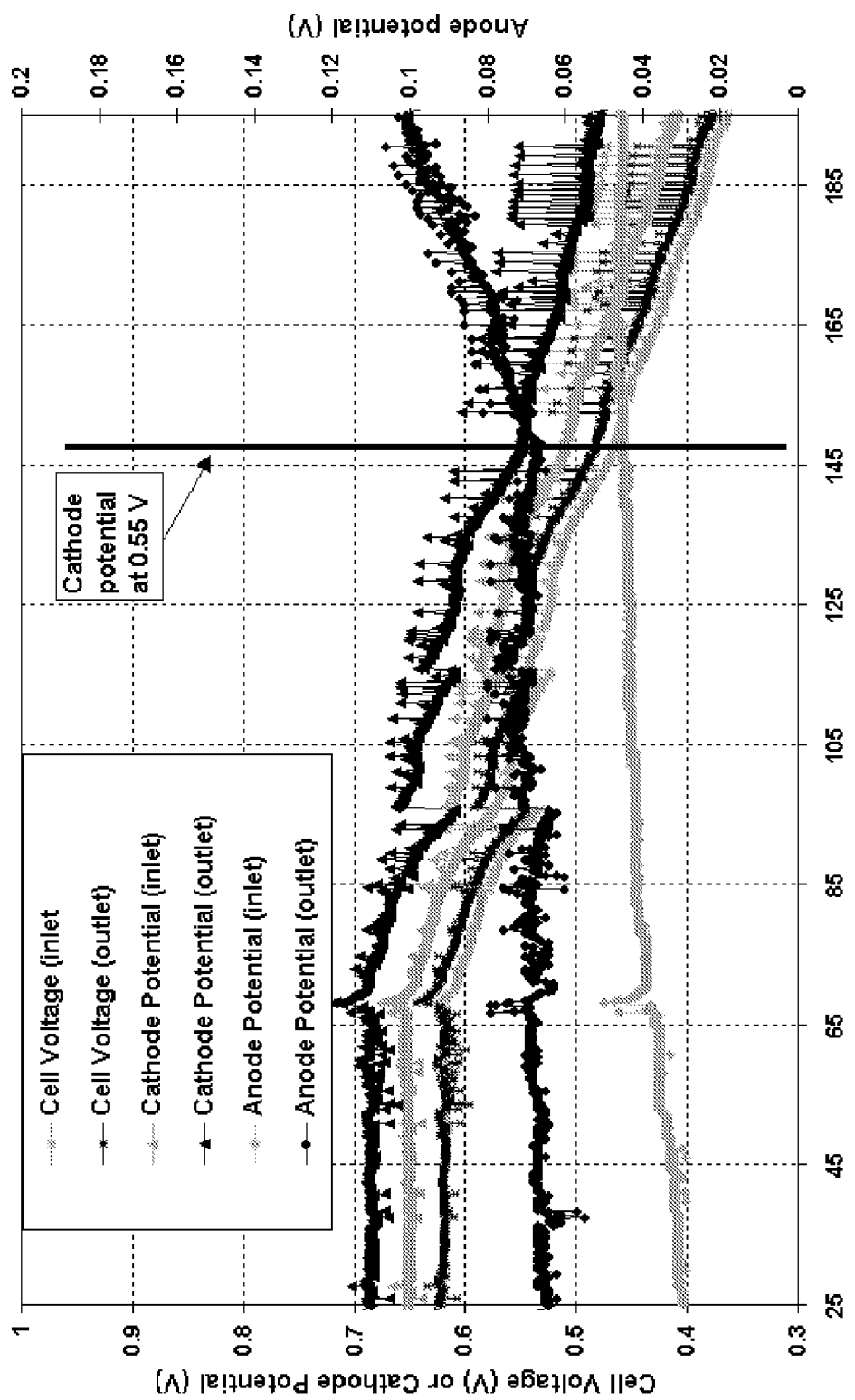
FIG. 1 shows a graphical representation of anode and cathode potentials, as well as fuel cell voltage, at the inlet and outlet regions of a fuel cell during one experiment.

In the following description, certain specific details are set forth in order to provide a thorough understanding of the various embodiments. However, one skilled in the art will understand that the invention may be practiced without these details. In other instances, well-known structures associated with fuel cells, fuel cell stacks, and fuel cell systems have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to". Also, reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As mentioned in the foregoing, sulfur contaminants in polluted air that is used as the oxidant for fuel cells can adsorb onto the platinum-based electrocatalyst in the cathode and negatively impact fuel cell performance. It has been discovered that when the cathode potential of the fuel cell drops below about 0.55V, sulfur can cross-over from the cathode to the anode, thus adsorbing onto the anode platinum-based electrocatalyst and poisoning it, even when pure hydrogen is used as the hydrogen-based fuel. Thus, methods of recovering fuel cell performance due to sulfur contamination from sulfur dioxide in the oxidant, such as polluted air, should also include steps to recover fuel cell performance due to sulfur contamination in the anode as well, even when the hydrogen-based fuel does not contain sulfur poisons.

To this end, a recovery procedure is disclosed herein that can substantially remove sulfur poisons from the cathode and the anode in a controlled manner when sulfur cross-over is detected. In general terms, the recovery procedure includes temporarily shutting down the fuel cell by performing an oxidant starvation, followed by subjecting the cathode to a high potential, and then subjecting the anode to a high potential, before restarting the fuel cell.

Without being bound by theory, it is believed that when oxidant starvation is performed during fuel cell operation, the cathode potential drops and sulfur dioxide found in air, which is typically used as the oxidant that is supplied to the cathode, adsorbs onto the cathode platinum-based electrocatalyst. It then reduces to sulfur and adsorbs onto the cathode platinum-based electrocatalyst via reaction (1):

$$Pt—(SO_2)_{ads} + 4H^+ + 4e^- \leftrightarrow Pt—S_{ads} + 2H_2O \quad E_{eq} < 0.4V \quad (1)$$

Because the cathode potential is substantially reduced during oxidant starvation, typically to a potential close to 0 V, the adsorbed sulfur reacts with the protons in the cathode to form hydrogen sulfide, which adsorbs onto the platinum-based electrocatalyst.

$$2H^+ + S + 2e^- \leftrightarrow H_2S \quad E_{eq} < 0.14V \quad (2)$$

$$H_2S + Pt \rightarrow Pt—(H_2S)_{ads} \quad (3)$$

To remove the adsorbed hydrogen sulfide, the cathode is brought to a high potential after oxidant starvation so that hydrogen sulfide will react with water vapor in the oxidant to form sulfate ions via reaction (4), which is then removed with the flow of unreacted oxidant. In particular, the cathode may be brought to open circuit voltage after oxidant starvation by removing the primary load while oxidant is supplied to the cathode. Without being bound by theory, by bringing the cathode to as high a potential as possible in a commercial fuel cell system, which is typically open circuit voltage, sulfur can be oxidized more quickly to sulfate ions.

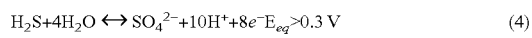

$$H_2S + 4H_2O \leftrightarrow SO_4^{2-} + 10H^+ + 8e^- \quad E_{eq} > 0.3 \text{ V} \quad (4)$$

Thus, by carrying out oxidant starvation, followed by subjecting the cathode to a high potential, sulfur dioxide can be substantially removed from the cathode. More specifically, as mentioned in the foregoing, it has been discovered that sulfur (likely from reaction (1)) crosses over to the anode when the cathode potential drops to less than a threshold cathode potential. This threshold cathode potential has been experimentally determined to be about 0.55 V (see Examples). Sulfur that crosses over to the anode likely follows reactions (2) and (3) in the anode and, thus, hydrogen sulfide adsorbs onto the anode platinum-based electrocatalyst. By bringing the anode to a high potential, for example, by supplying a second oxidant, such as air, to the anode, hydrogen sulfide may react with water vapor in the second oxidant to form sulfate ions via reaction (4), which are then removed from the anode with the flow of second oxidant. Thus, by following the above procedure, sulfur can be systematically removed from the cathode and the anode, and the fuel cell can be restarted.

Accordingly, one embodiment of the present method to remove contaminants comprises supplying a hydrogen-based fuel to the anode; supplying an oxidant to the cathode, wherein the oxidant comprises at least some sulfur dioxide (such as at least about 0.01 ppm); drawing a primary load from the fuel cell stack while supplying the hydrogen-based fuel to the anode and the oxidant to the cathode; shutting down the fuel cell when a voltage of the fuel cell is equal to or less than a threshold voltage at which sulfur crosses over from the cathode to the anode; wherein shutting down the fuel cell comprises: performing at least one oxidant starvation while drawing the primary load; removing the primary load after performing the at least one oxidant starvation; and bringing the anode to a high potential after removing the primary load; and thereafter, restarting the fuel cell.

The hydrogen-based fuel supplied to the anode may be, for instance, substantially pure hydrogen, hydrogen from a reformate-based fuel, by-product hydrogen (such as that generated by chemical processing plants), or combinations thereof, while the oxidant supplied to the cathode is typically air. As mentioned in the foregoing, air often contains at least some sulfur dioxide due to pollution. For example, the air may contain about 0.01 ppm of sulfur dioxide in less polluted areas, but may contain up to or more than 0.125 ppm of sulfur dioxide in highly polluted areas.

During operation, such as when electricity is produced by the fuel cell stack, a primary load is drawn from the fuel cell stack while the hydrogen-based fuel is supplied to the anode and oxidant is supplied to the cathode. When a voltage of the fuel cell indicates that sulfur has crossed over from the cathode to the anode, the fuel cell may be shut down. The voltage of the fuel cell may be represented, for example, by the cathode potential or the fuel cell voltage. The cathode potential may be measured by a reference electrode, such as those described in M. Lauritzen et al., *Journal of New Materials for Electrochemical Systems*, 10: 143-145, 2007. However, current methods of determining the cathode potential using reference electrodes are not always desirable in commercial fuel cell systems.

Thus, in an alternative embodiment, the voltage of the fuel cell, which is the difference between the cathode potential and the anode potential, may be the fuel cell voltage. The fuel cell voltage may be measured using a cell voltage monitoring device that is commonly known in the art. To account for the anode overpotential, which is typically less than about 70 mV depending on the operating conditions (e.g., temperature, pressure, and load), the threshold voltage may range from about 0.48 V to about 0.55 V. For instance, the threshold voltage may be equal to or less than about 0.55 V, 0.53 V, 0.50 V or 0.48 V. In some embodiments, the fuel cell voltage may be the voltage of any one fuel cell in a fuel cell stack. In other embodiments, the fuel cell voltage may be the average voltage of the fuel cells of the fuel cell stack. In yet other embodiments, the fuel cell voltage may be the average voltage of any one group of fuel cells in a fuel cell stack.

Prior to removing the load upon shutdown, oxidant starvation is performed to decrease the cathode potential. Oxidant starvation may be performed more than once by any method known in the art that will interrupt the supply of oxidant to the cathode while the primary load is drawn so that the cathode potential temporarily decreases to close to 0 V (vs. SHE) during fuel cell operation, such as those methods described in U.S. Pat. No. 6,472,090. For example, oxidant starvation may be performed by closing an oxidant inlet supply valve, which is typically upstream of the fuel cell, and then opening the oxidant inlet supply valve after a short period of time. Additionally, or alternatively, oxidant starvation may be performed by temporarily reducing the amount of oxidant to the cathode to less than the minimum stoichiometry of oxidant necessary to sustain the primary load, and then bringing it back to higher stoichiometry and/or to normal conditions after a short period of time. This will also temporarily decrease the cathode potential. After oxidant starvation, the cathode can be subjected to a high potential simply by removing the load. As oxidant is still provided to the cathode, the cathode potential will be at or close to open circuit voltage.

In addition, the step of bringing the anode to a high potential by introducing another or second oxidant, such as air, into the anode can be performed such that the remaining hydrogen-based fuel in the anode is substantially displaced out of the anode in less than 1.0 second, such as less than 0.2 second, by quickly moving a front of oxidant/hydrogen-based fuel through the anode. It is known in the art that a hydrogen/oxidant front in the anode will result in corrosion and/or degradation of the fuel cell components due to an undesirable elevation in the cathode potential. Thus, it is preferred that the hydrogen-based fuel is quickly displaced by the oxidant. In some applications, the second oxidant that is used to purge out the anode may be the same as the first oxidant that was provided to the cathode (e.g., air), and thus may contain at least some sulfur dioxide. However, if the purge duration is kept short, the effect of sulfur dioxide adsorbing on the anode platinum electrocatalyst is relatively small.

In some embodiments, an auxiliary load may be drawn to substantially consume all the hydrogen in the anode after removing the primary load and prior to bringing the anode to a high potential. This will prevent hydrogen from being purged into the atmosphere, and will eliminate the front of oxidant/hydrogen in the anode if oxidant is purged into the anode to bring the anode to a high potential, and thereby reduce the risk of corrosion and/or degradation of the fuel cell components. Attention should be taken to avoid fuel starvation, which would bring the fuel cell into voltage reversal.

After all the sulfur is substantially removed from the fuel cell, the fuel cell may be restarted using any startup method known in the art. For example, oxidant may be resupplied to the cathode and a hydrogen-based fuel may be resupplied to the anode. The primary load may be drawn while or after the resupply of oxidant and hydrogen-based fuel has been initiated. Again, if there is residual oxidant in the anode, the hydrogen-based fuel should be resupplied such that it substantially displaces the residual oxidant in less than 1.0 second, such as less than 0.2 second, by quickly moving a front of hydrogen-based fuel/oxidant through the anode to reduce or prevent corrosion and/or degradation of the fuel cell components.

In hybrid systems that include both a fuel cell stack and a second power generating device, such as a second fuel cell stack or a battery, power consumption can be diverted to the second power generating device while the fuel cell stack is shut down to remove the contaminants so that power generation is not interrupted.

The following examples are provided for the purpose of illustration, not limitation.

Example 1

Sulfur Crossover

To confirm sulfur crossing over from the cathode to the anode, a fuel cell with a platinum-ruthenium alloy electrocatalyst in the anode and platinum black electrocatalyst in the cathode was hooked up with reference electrodes (such as those described in M. Lauritzen et al., *Journal of New Materials for Electrochemical Systems*, 10: 143-145, 2007) at the fuel cell inlet and outlet regions of the anode side to monitor potential changes in both the anode and the cathode, as well as the cell voltage in the inlet and outlet regions. The fuel cell was operated at 1 A/cm$^2$ current density with co-flow operation (fuel, oxidant, and coolant all running in the same direction) under the following conditions:

TABLE 1

Fuel Cell Operating Conditions

| | |
|---|---|
| Temperature | 65° C. (coolant inlet) |
| Inlet Dew Point | 65° C. (fuel and oxidant) |
| Fuel | 100% Hydrogen |
| Oxidant | 21% oxygen/79% nitrogen (simulated air), with and without 2 ppm $SO_2$ |
| Reactant inlet pressure | 2.0 barg (fuel and oxidant) |
| Reactant stoichiometry | 1.2 for fuel, 1.8 for oxidant |

FIG. 1 shows the potentials and fuel cell voltage at the inlet and outlet regions. Simulated air was used as the oxidant for the first 70 hours from time zero, and then simulated air with sulfur dioxide was supplied to the cathode. It is evident that the anode potentials at the inlet and outlet regions remained relatively steady at the onset of sulfur dioxide introduction in the cathode while the cathode potentials, as well as the fuel cell voltages at the inlet and outlet regions, slowly decreased, likely due to sulfur dioxide poisoning of the cathode platinum electrocatalyst. When the cathode potential at the outlet region decreased to about 0.55 V (shown at the bold vertical line in the graph), the anode potential at the outlet region began to rise rapidly with increasing sulfur dioxide addition in the cathode, thus indicating anode electrocatalyst poisoning or significant catalyst degradation. It should be noted that the anode potential at the inlet region still remained relatively steady despite the fact that the anode potential at the outlet region was steadily increasing. Without being bound by theory, it is suspected that the transport of sulfur from the cathode to the anode occurs via water transport; namely, water is transferred from the anode to the cathode at the oxidant inlet region, and then diffuses back from the cathode into the anode throughout the remainder of the active area, thereby facilitating sulfur transport from the cathode to the anode at the outlet region, and little or no sulfur transport from the cathode to the anode at the inlet region.

Example 2

Recovery Techniques

Figure 2:
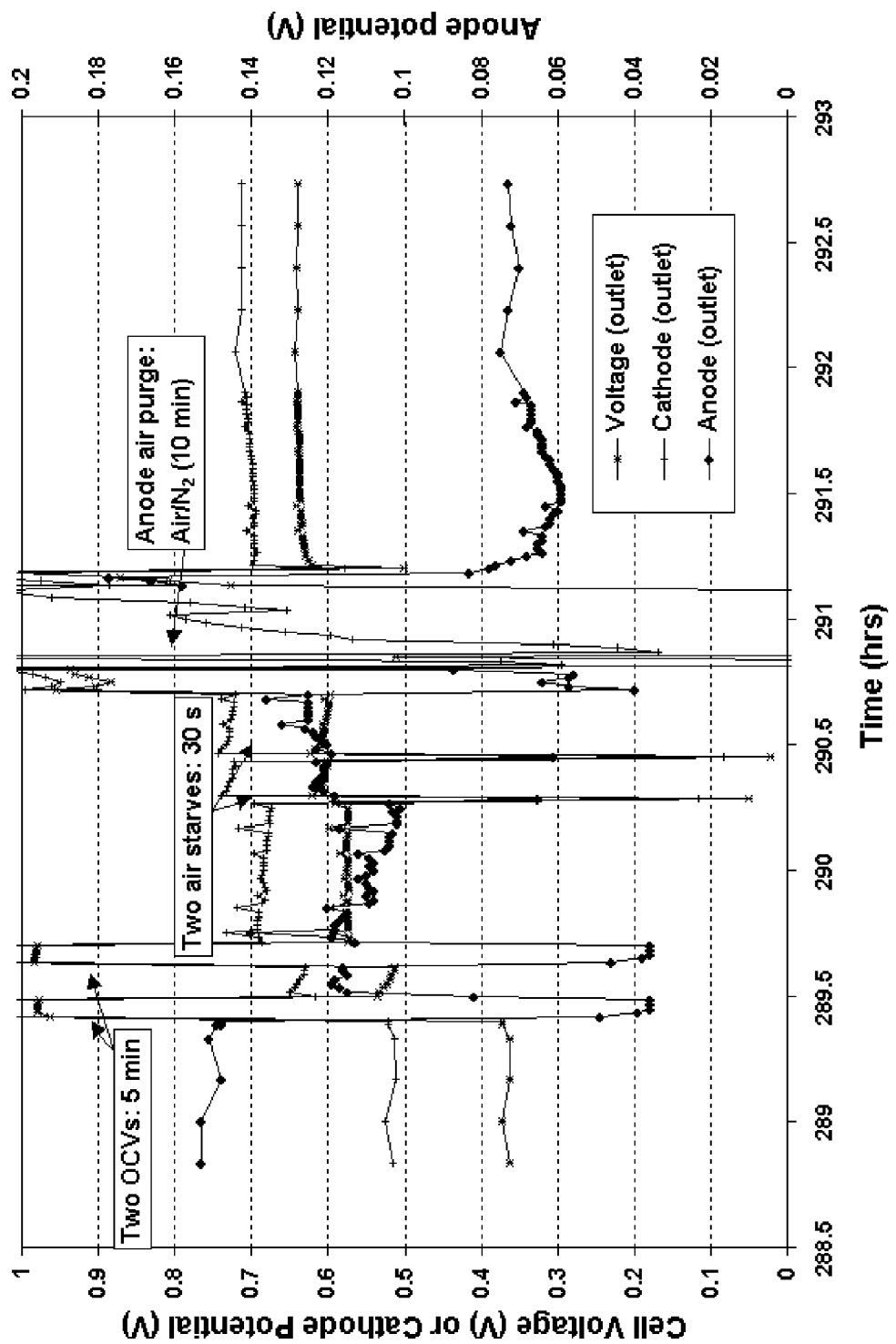
FIG. 2 shows a graphical representation of anode and cathode potentials, as well as fuel cell voltage, at the outlet region of a fuel cell during another experiment.

The fuel cell of Example 1 was operated under the conditions of Table 1 for about 300 hours, and then subjected to a number of recovery techniques. The anode and cathode potentials, as well as the fuel cell voltage at the fuel cell outlet are illustrated in FIG. 2. It is evident that the anode potential is substantially higher than what it should normally be, at about 150 mV rather than at about 60 mV (see FIG. 1).

First, the fuel cell was subjected to open circuit voltage twice by removing the primary load for 5 minutes and then reapplying the primary load each time. Although the fuel cell voltage and the cathode potential increased while the anode potential decreased, the anode potential was still high.

Next, the fuel cell was air starved twice by shutting off the air for 30 seconds and then resupplying the air. Again, there was an improvement in the fuel cell voltage and the cathode potential. However, the anode potential increased, thus suggesting further anode electrocatalyst poisoning.

Finally, the primary load was removed and then simulated air was purged into the anode for 10 minutes. After reapplying the primary load, the anode potential decreased by 50 mV, thus suggesting that the platinum-based anode electrocatalyst was poisoned, and that the poison was removed during the anode air purge, which is believed to be due to the high potential in the anode during the air purge.

All of the above U.S. patents, U.S. patent application publications, U.S. patent applications, foreign patents, foreign patent applications and non-patent publications referred to in this specification and/or listed in the Application Data Sheet are incorporated herein by reference, in their entirety.

From the foregoing, it will be appreciated that, although specific embodiments have been described herein for the purpose of illustration, various modifications may be made without departing from the spirit and scope of the invention. Accordingly, the invention is not limited except by the appended claims.

What is claimed is:

1. A method for removing contaminants in a fuel cell comprising an anode comprising a first platinum-based electrocatalyst, a cathode comprising a second platinum-based electrocatalyst, and a polymer electrolyte interposed therebetween, the method comprising:
   supplying a hydrogen-based fuel to the anode;
   supplying a first oxidant to the cathode, wherein the first oxidant comprises at least some sulfur dioxide;
   drawing a primary load from the fuel cell stack while supplying the hydrogen-based fuel to the anode and the first oxidant to the cathode;
   shutting down the fuel cell when a voltage of the fuel cell is equal to or less than a threshold voltage at which sulfur crosses over from the cathode to the anode, wherein shutting down the fuel cell comprises:
       performing at least one oxidant starvation while drawing the primary load;
       removing the primary load after performing the at least one oxidant starvation; and
       bringing the anode to a high potential after removing the primary load; and thereafter,
   restarting the fuel cell.

2. The method of claim 1, wherein the voltage of the fuel cell is the difference between an anode potential and a cathode potential, and the threshold voltage is about 0.55 V.

3. The method of claim 1, wherein the threshold voltage is about 0.53 V.

4. The method of claim 1, wherein the threshold voltage is about 0.50 V.

5. The method of claim 1, wherein the threshold voltage is about 0.48 V.

6. The method of claim 1, wherein the voltage of the fuel cell is a cathode potential, and the threshold voltage is about 0.55 V.

7. The method of claim 1, wherein the hydrogen-based fuel is substantially pure hydrogen, reformed hydrogen from a reformate-based fuel, by-product hydrogen, or combinations thereof.

8. The method of claim 1, wherein the first oxidant is air.

9. The method of claim 1, wherein performing at least one oxidant starvation comprises interrupting the supply of the first oxidant to the cathode.

10. The method of claim 9, wherein performing at least one oxidant starvation comprises closing an oxidant supply valve to stop the flow of the first oxidant upstream of the fuel cell, and then opening the oxidant supply valve to allow the supply of the first oxidant to the cathode.

11. The method of claim 1, wherein performing at least one oxidant starvation comprises reducing the amount of the first oxidant supplied to the cathode.

12. The method of claim 1, wherein shutting down the fuel cell further comprises drawing an auxiliary load to substantially consume all the hydrogen in the anode, after removing the primary load and prior to bringing the anode to a high potential.

13. The method of claim 1, wherein bringing the anode to a high potential comprises substantially displacing the hydrogen-based fuel in the anode with a second oxidant in less than 1.0 second.

14. The method of claim 13, wherein the hydrogen-based fuel in the anode is displaced with the second oxidant in less than 0.2 seconds.

15. The method of claim 1, wherein the first oxidant is air.

16. The method of claim 1, further comprising a second oxidant and wherein the second oxidant is air.

17. The method of claim 1, wherein restarting the fuel cell comprises:
   resupplying the hydrogen-based fuel to the anode;
   resupplying the first oxidant to the cathode; and
   drawing the primary load from the fuel cell stack while or after resupplying the hydrogen-based fuel to the anode and the first oxidant to the cathode are initiated.

18. The method of claim 1, wherein the first oxidant comprises at least about 0.01 parts per million sulfur dioxide.

* * * * *